Feb. 3, 1970 E. R. HAIR 3,493,388
PROCESS FOR PREPARING INSTANT COFFEE
Filed Nov. 30, 1966
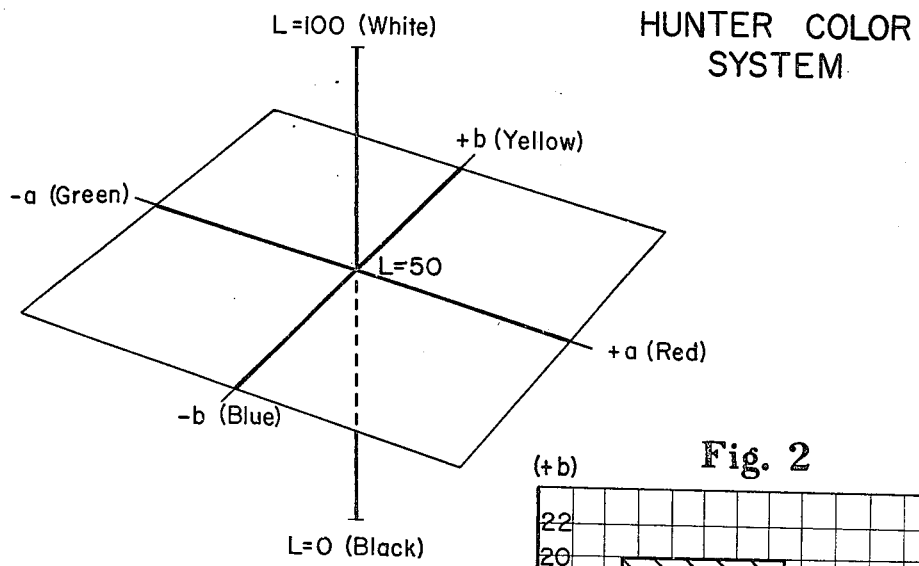
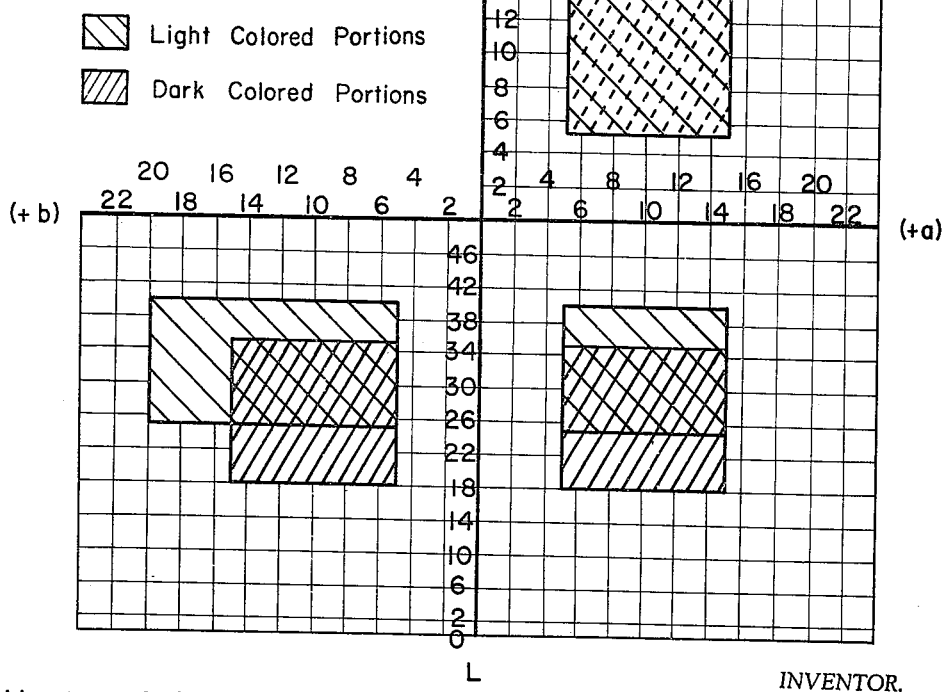
Hunter Color Co-ordinates of Light and Dark Colored Portions of Coffee
INVENTOR.
Eddy R. Hair

United States Patent Office 3,493,388
Patented Feb. 3, 1970

3,493,388
PROCESS FOR PREPARING INSTANT COFFEE
Eddy R. Hair, Colerain Township, Hamilton County, Ohio, assignor to The Procter & Gamble Company, Cincinnati, Ohio, a corporation of Ohio
Filed Nov. 30, 1966, Ser. No. 598,004
Int. Cl. A23f 1/08
U.S. Cl. 99—71    2 Claims

ABSTRACT OF THE DISCLOSURE

Disclosed is a method of preparing an instant coffee product composed of agglomerated particles of light colored and dark colored instant coffees. The light colored coffee portion comprises from about 10% to about 50% by weight of the agglomerated product and the dark colored coffee portion comprises from about 50% to about 90% by weight of the agglomerated product. The light colored portion and the dark colored portion which are agglomerated to form a product having an appearance substantially similar to that of roast and ground coffee have Hunter color values on the L scale differing by at least 5 units.

---

This invention relates to instant coffee. It deals with a unique agglomerated instant coffee product which has an appearance resembling that of roast and ground coffee.

For many years producers of instant coffee have sought to eliminate the distinctions which consumers draw between instant and non-instant coffee products. The preponderance of this effort has gone into the area of flavor improvement. While absolute equality in the flavor of the beverages produced from the two types of coffee products has not been achieved, a substantial increase in consumer acceptance of the flavor of instant coffee has occurred in the last 10 to 15 years. Other physical characteristics, such as aroma, bulk density and particle size have been investigated in an attempt to make instant coffee more appealing to the consumers.

It has been found that a large number of consumers would prefer an instant coffee product which, in addition to having good coffee aroma and producing coffee beverage with brew-like flavor, has the physical appearance of roast and ground coffee. While some passing attention has been given to the production of darker instant coffee products to make them more coffee-like, little, if any, effort has been devoted to preparing instant coffee which has the physical appearance of roast and ground coffee.

Possibly the lack of effort in this area stems from the fact that the casual observer considers roast and ground coffee to be a uniformly colored product. However, careful inspection will reveal that this is not the case. Roast and ground coffee is composed of particles which appear to vary from a light brown to a dark reddish-brown in color, and even exhibit color variations within the individual particles. This appearance is caused by two factors: (a) actual color differences in the ground product generally caused by uneven roasting from the outside to the inside of the bean and from uneven roasting of different beans; and (b) apparent color differences caused by the reflection of light from various coffee particle surfaces when these surfaces differ in the angle they form with the line of sight of the observer.

It is an object of this invention to provide an instant coffee product which has the appearance of roast and ground coffee.

It is another object of this invention to provide instant coffee comprising individual particles which have a size and color variation analogous to roast and ground coffee.

These and other objects are achieved by providing an instant coffee product which has the appearance of roast and ground coffee which comprises a mixture of at least two portions of instant coffee particles, a light colored portion of instant coffee comprising from about 10% to about 50% by weight of the coffee product and having a color which is defined by Hunter color values of: L scale, from about 25 to about 40; $a$ scale, from about 5 to about 15; and $b$ scale, from about 5 to about 20; and a dark colored portion of instant coffee comprising from about 25% to about 90% by weight of the coffee product and having a color which is defined by Hunter color values of: L scale, from about 18 to about 35; $a$ scale, from about 5 to about 15; and $b$ scale, from about 5 to about 15; the light colored portion of instant coffee differing on the Hunter color L scale from the dark colored portion of instant coffee by at least 5 units, the mixture of portions of instant coffee particles being uniformly agglomerated to produce particles, at least about 80% by weight of which have a size of from about 12 to about 48 mesh, United States Standard screen sizes. Preferably, the light colored portion of instant coffee comprises from about 10% to about 20% by weight of the coffee product and the dark colored portion comprises from about 60% to about 90% by weight of the coffee product. The balance of the instant coffee product, if any, consists of one or more additional portions of instant coffee particles having any conventional coffee color; as long as the color requirements for the above defined light and dark colored portions of instant coffee are met, the color of these additional portions of instant coffee is not critical. However, the light and dark colored portions of instant coffee as defined above are preferably the lightest and darkest colored portions in the coffee product.

As used above and hereafter, the word "agglomerated" refers to relatively larger particles which are prepared by combining a number of relatively smaller particles into a single unit. Processes for accomplishing the "agglomeration" are more fully discussed below.

The invention disclosed herein frequently is discussed in terms of only two portions of coffee particles. Such compositions form a preferred embodiment of this invention because of their comparative ease of preparation. When only two portions of instant coffee are used, the light colored portion can comprise from about 10% to about 50% by weight, and preferably about 10% to about 20% by weight, of the coffee product. The dark colored portion comprises the balance, i.e., from about 50% to about 90% by weight, and preferably from about 80% to about 90% by weight, of the coffee proudct.

The Hunter color system is a well-known means of defining the color of a given material. A complete technical description of the system can be found in an article by R. S. Hunter, "Photoelectric Color Difference Meter," Journal of the Optical Society of America, vol. 48, pp. 985–95, 1958.

Basically, the Hunter color system can be described in terms of a three-dimensional color solid. This solid contains all possible colors and has three perpendicular axes passing through its geometric center. The three axes contained in the Hunter color solid are shown in accompanying FIGURE 1. The location of any point within the figure can be determined by reference to its coordinates on these three axes; therefore any color can be defined in terms of these three coordinates.

In the Hunter color system the vertical axis is designated the L scale and contains 100 equal units of division. Absolute black is at the bottom of the scale (L=0) and absolute white is at the top (L=100). As is shown in FIGURE 1, the two horizontal axes are designated respectively the $a$ and $b$ scales. The $a$ scale intercepts the L scale at L=50; and $+a$ portion of the $a$ scale extends to the right of the L scale and —a to the left. Similarly the b scale intercepts the L scale at L=50 with +b extending behind the L scale and —b extending in front.

The L scale coordinate is a measure of relative lightness and darkness of the color whereas the a and b scale coordinates define the hue. The plane formed by the a and b scales forms in effect, an ordinary color wheel or, in other words, a circular color spectrum. Beginning with red on the +a scale, the spectrum runs counter clockwise passing through yellow at +b, green at —a, blue at —b and black again to red as +a is approached. The distance from the L scale on the a and b scales is a measure of color intensity. The least intense shades reside near the L scale, and the color becomes progressively more intense as the distance from the L scale increases.

The use of the Hunter color system provides an accurate and reproducible means of color measurement. Techniques have been developed which permits the use of this color measurement system on materials of practically all shapes and sizes. Devices specifically designed for the measurement of color on the Hunter color scales are described in United States Patent 3,003,388 to Hunter et al, issued Oct. 10, 1961.

The area of color designated for the coffee particles disclosed herein is bounded by the +a and the +b axes between L=0 and L=50. These portions of the axes bound the lower right rear portion of the color solid of FIGURE 1. The pertinent portion of the color solid is shown in three-view form in accompanying FIGURE 2. FIGURE 2 also contains the orthographic projections of the parallelograms which define the areas of color for the portions of instant coffee used in the invention disclosed herein.

The rectangular solid bounded by the approximate values of L=25 to 40, a=5 to 15, and b=5 to 20, defines the light color portion of instant coffee for use in the compositions of this invention. These a and b values, as well as all a and b values hereafter, are coordinates on the "+" portions of the scales. The parallelogram bounded by the approximate values of L=18 to 35, a=5 to 15, and b=5 to 15 defines the dark colored portion of instant coffee for use in the compositions of this invention. Darker, or "French," roasts can be simulated by using mixtures of instant coffees having L values at or near the lower limits in the above defined ranges. Conversely, "lighter" roasts may be simulated by using mixtures of instant coffees having L values at or near the upper limits. To achieve a roast and ground appearance in the instant coffee, the light and dark colored portions of instant coffee must differ by at least 5 units on the L scale. Preferably, they differ by at least about 7 units.

It has been found that the agglomerated mixtures of instant coffee particles of this invention have an appearance significantly more related to roast and ground coffee than prior art coffee compositions. Compositions of the type disclosed herein have been found to have significant consumer appeal. Products of particular appeal are produced when the light colored portion of instant coffee in the mixture which is to be agglomerated has a color which is defined by Hunter color values of: L scale, from about 29 to about 32; a scale, from about 9 to about 11; and b scale, from about 13 to about 16; and the dark colored portion of the instant coffee in the mixture has a color which is defined by Hunter color values of: L scale, from about 21 to about 25; a scale, from about 7 to about 9; and b scale, from about 9 to about 11; and the light colored portion of instant coffee differs on the Hunter color L scale from the dark colored portion of instant coffee by at least 5 units.

Coffee particles used in the agglomerated instant coffee products of this invention can be prepared by any convenient process. Conventionally, instant coffee is prepared by roasting and grinding a blend of coffee beans, extracting the roast and ground coffee with water to form an aqueous coffee extract, and drying the extract to form the instant coffee product. Various techniques, the most important of which are discussed below, allow the removal and preservation of the more fugitive coffee flavor materials, and their subsequent readdition to the coffee product in a manner wherein they are not destroyed.

Typical roasting equipment and methods for the roasting of coffee beans are described, for example, in Sivetz and Foote, "Coffee Processing Technology," Avi Publishing Co., Westport, Conn., 1963, vol. 1, pp. 203–26. Coffee oil often is expelled from a portion of the roasted beans prior to grinding. The oil, which contains a significant amount of high quality coffee flavor and aroma constituents, is chilled to about 20° F., or less and saved for addition to the dry, instant coffee product generally immediately prior to packaging. The coffee beans which have not been oil expelled are ground, preferable to a United States Standard screen size of from about 8 mesh to about 20 mesh. Typical oil expelling equipment is described, for example, in Sivetz, "Coffee Processing Technology," Avi Publishing Co., Westport, Conn., 1963, vol. 2, pp. 27–30; typical grinding equipment is described, for example, in Sivetz and Foote, supra, pp. 239–50.

While numerous types of continuous or batch extraction systems can be used, the most commonly used system for the extraction of roast and ground coffee is a multi-column extraction train. This system is composed of a number of elongated extraction columns connected in series for continuous countercurrent operation. While in these columns, and prior to extraction, the roast and ground coffee can be distilled to remove the volatile flavor fraction and the flavor fraction can be condensed. The distillation often is accomplished by passing steam through the coffee column for from about 10 to about 45 minutes. The condensate can be added immediately to a previously obtained extract; if not, it should be chilled to about 20° F. or less and maintained at that temperature until such time as it is added to an extract.

Once the distillation operation is completed, the coffee is extracted by admitting hot water, such as from about 320° F. to about 375° F., to the last column of the extraction train. The temperature is allowed to decrease by natural heat losses as it passes through the system, and is withdrawn from the column containing the freshest (previously unextracted) roast and ground coffee at a temperature of from about 190° F. to about 230° F. Typical disclosures of equipment and methods which can be used in the above operations are as follows: steam distillation—Sivetz, supra, pp. 43–46, and United States Patent 2,562,206 to Nutting, issued July 31, 1951; extraction—Sivetz and Foote, supra, pp. 261–378, and United States Patent 2,515,730 to Ornfelt, issued July 18, 1950.

Once the coffee extract has been obtained, it is preferable for the extract to be concentrated to at least about 45% by weight coffee solubles. This concentration step is particularly beneficial for extracts which contain a previously obtained distillate. The high concentration of coffee solubles helps to preserve the fugitive coffee flavor materials from deterioration. Concentration can be by any conventional method, such as freeze concentration, thin film evaporation, and flashing, or by the addition of previously dried coffee powder. The extract is then dried.

The color of the final instant coffee for use in the agglomerated product disclosed herein is heavily influenced by the method and operating conditions of the drying operation. While any convenient drying method can be used, the most common drying method is spray drying. Proper control of the spray drying conditions will enable production of instant coffees having colors within the full ranges designated above for use in the products of this invention.

As a general rule, relatively light colored spray dried instant coffee has a lower bulk density and is composed of larger, thin walled particles than its darker counterparts. Some factors which tend to favor formation of lighter colored spray dried particles are low extract densities, moderate atomizing pressures during drying, and the use of high temperature air in drying. In addition, lighter color also can be promoted by the use of lighter colored roasted beans and the presence of a high concentration of hydrolysis products in the extract. These hydrolysis products are obtained by the use of high extraction temperatures.

Conversely, relatively dark spray dried instant coffee particles generally have higher bulk density and are composed of smaller particles with thick walls than lighter colored spray dried coffee. Spray drying conditions which tend to influence the formation of this type of particle are high density extracts, moderately high spraying pressures, and the use of lower temperature air in drying. Other factors which tend to give darker products are the use of darker roasted beans, and the presence of excess fatty acids in the extract.

The average skilled worker in the art can readily vary one or more of the above operating parameters in drying of coffee extracts and produce coffee products having the desired color characteristics. The vast number of variables makes available a large number of drying processes which are capable of producing the desired results.

However, some drying processes will produce the desired product with a greater degree of consistency and color reproducibility. For these reasons the preferred spray drying operation for producing the light colored portion of instant coffee for use in the compositions of this invention, as defined above, is by atomizing at moderate pressures (about 300 p.s.i.g. to about 400 p.s.i.g.) an extract (about 35% to about 50% by weight coffee solubles in water) of low density (about 0.5 to about 0.9 gm./cc. at 75° F.) using moderate air temperatures in the drying tower (from about 450° F. to about 500° F. inlet, and from about 230° F. to about 270° F. outlet).

Similarly, the preferred spray drying operation for producing the dark colored portion of instant coffee for use in the compositions of this invention, as defined above, is by atomizing at moderately high pressures (about 450 p.s.i.g. to about 600 p.s.i.g.) a high concentration extract (about 45% to about 60% by weight coffee solubles in water) of high density (from about 1.1 to about 1.2 gm./cc. at 75° F.) using moderate air temperatures in the drying tower (from about 450° F. to about 500° F. inlet, and from about 230° F. to about 270° F. outlet).

Generally, the light and dark colored portions of instant coffee are spray dried separately, and then are mixed and agglomerated prior to packaging for shipment and sale. Alternatively, a spray drying tower can be equipped with a plurality of spray nozzles and two or more separate extracts sprayed simultaneously to produce a mixture of the portions of instant coffee without the need for a separate mixing operation.

In a particularly preferred embodiment of this invention, one of the portions of instant coffee is freeze dried. Freeze dried instant coffee is prepared by freezing a coffee extract prepared as described above. The frozen extract, granulated if desired, then is placed in a chamber under vacuum (preferably less than 500 microns of mercury absolute pressure) and maintained at low temperatures (preferably less than −15° F.). Heat then is applied to remove water from the frozen extract by sublimation. Processes of this type are often capable of achieving excellent flavor retention during drying.

The freeze dried portion of the present compositions can be either the light or the dark colored portion, but preferably it is the light colored portion. The color of the freeze dried product can be controlled conveniently by varying the rate at which the extract is frozen. As the freezing rate increases the color of the final freeze-dried product becomes lighter. For example if a coffee extract is placed in a freezing tray to a depth of about ¼ inch, and then rapidly frozen by placing the tray in a freezing chamber having a temperature of about −50° F., the freeze dried product will have a light brown color within the range of the light colored portion of instant coffee as defined above. When the same process is repeated and the extract is frozen using a freezing chamber temperature of about −5° F., the freeze dried product will have a darker brown color within the range of the dark colored portion of instant coffee as defined above. Further, these two freeze dried products will differ on the Hunter color L scale by at least 5 units.

The type of freeze drying equipment which is used in preparing the freeze dried coffee described above is not a limitation upon this invention. Many manufacturers produce commercial and laboratory size freeze driers which are useful in preparing freeze dried coffee. Any of such driers can be used in the practice of this invention. Similarly, the specific process conditions used in producing the freeze dried coffee is not a limitation upon this invention. Freeze dried coffee for use in the compositions disclosed herein can be prepared by any known freeze drying process.

Typical disclosures relating to processes and equipment for freeze drying can be found, for example, in Copley and Van Arsdel, "Food Dehydration," Avi Pub. Co., Westport, Conn., 1964, vol. II, pp. 105–31, Perry, "Chemical Engineers' Handbook," McGraw-Hill Book Co., New York, 4th ed., 1963, pp. 17–26 to 17–28, Tressler and Evers, "The Freezing Preservation of Foods," Avi Pub. Co., Westport, Conn., vol. 1, pp. 612–26, and in United States Patent 2,751,687 to Colton, issued June 26, 1956.

Mixtures of spray dried and freeze dried coffee in the composition of this invention are preferred because of the greater brew-like coffee flavor which is given to the final product. Surprisingly it has been found that substantially greater increases in flavor are achieved by the addition of freeze dried coffee to spray dried coffee than would be expected from the relative amounts of each which are used. For example, when an expert panel tasted various combinations of spray dried and freeze dried coffee, it was found that the flavor of a combination composed of about 50% by weight freeze dried and about 50% by weight spray dried coffee was substantially indistinguishable from that of 100% freeze dried coffee. Further it was found that about 50% of the flavor increase achieved by the addition of freeze dried coffee to spray dried coffee was achieved by a blend of about 10% by weight freeze dried and about 90% by weight spray dried coffee. For this reason, preferred spray dried-freeze dried instant coffee mixtures of this invention contain at least about 10% by weight freeze dried instant coffee; most preferably, the freeze dried coffee comprises from about 10% by weight to about 50% by weight of the mixture.

Once the various colored portions of instant coffee particles have been obtained, they are mixed in preparation for the agglomeration step. (Instant coffee compositions wherein part or all of the various portions of instant coffee particles are agglomerated prior to mixing are disclosed and claimed in the copending United States patent application of Hair and Strang, Ser. No. 598,085, filed Nov. 30, 1966.) Mixing can be accomplished in any conventional mixer which provides reasonable interblending without undue attrition of the instant coffee particles. Typical examples of such mixers are ribbon blenders and gas or mechanically fluidized beds.

The method whereby agglomeration of the instant coffee particles is accomplished is not a limitation upon this invention. Many specialized processes and types of processing equipment have been developed for the agglomeration of particulate solids, such as instant coffee powder. However the same basic operating principles are involved in practically all cases. An agglomerating fluid, e.g., coffee oil, liquid water or steam, is uniformly distributed throughout the instant coffee powder causing part or all of the particles to become tacky. The particles are then agitated, allowing the tacky particles to contact and adhere to other particles. Proper control of the amount of agglomerating fluid and the type and time of agitation will provide control over the final size of the agglomerated product. Preferably, the agglomeration is continued until at least about 80% of the agglomerated particles reach a size which approximates that of conventional consumer roast and ground coffee, i.e., from about 12 to about 48 mesh, United States Standard screen size.

In a preferred agglomeration process, the blend of instant coffee particles having the above-described color characteristics and having a moisture content from about 1.5% to about 4.5% by weight are gently agitated together, preferably in a fluidized bed. While being agitated, the coffee particles are uniformly contacted with a fine spray of a concentrated aqueous coffee extract. The extract can contain from about 40% to about 70% by weight coffee solubles, and can be from about 1% to about 10% of the weight of the instant coffee particles. The specific amount and concentration of the extract are chosen to produce a final agglomerated product with a maximum moisture content of about 5%, preferably about 2% to about 4.5%, by weight. In this manner efficient agglomeration is achieved to an agglomerate size ranging from about 12 to about 48 mesh, United States Standard screen size, and, unlike most prior art agglomeration processes, no post-agglomeration drying step is needed.

After completion of the agglomeration, the agglomerates, which resemble roast and ground coffee, are ready for packaging, shipment and sale. Prior to packaging any coffee oil which has been expelled, if not used in the agglomeration step, is sprayed onto the agglomerates, preferably immediately before packaging and under an inert atmosphere.

The following examples are given to demonstrate the preparation of distinctly colored agglomerates of instant coffee within the scope of this invention. However, these examples are not intended to be limitations upon the invention. Unless stated to the contrary, all ratios and percentages in these examples are on a weight basis.

EXAMPLE I (A) Five thousand pounds of roast and ground coffee (through No. 8 mesh, 95% by weight on No. 20 mesh United States Standard screens) was used to prepare an aqueous coffee extract in a conventional countercurrent extraction train. The extraction train was composed of eight stainless steel columns connected in series for continuous operation. Each column was fifteen feet high, eighteen inches in diameter and held approximately 450 pounds of the roast and ground coffee. In the extraction operation water was admitted to the column of most spent coffee at 365° F. and allowed to cool by natural heat losses as it passed through the system. Extract was withdrawn from the column containing the freshest roast and ground coffee at a temperature of 205° F. The extract had a concentration of coffee solubles of 24% by weight (density=1.1 gm./cc. at 75° F.).

The extract was spray dried in a conventional spray tower, fourteen feet in diameter and thirty-five feet in height. The extract was atomized at a pressure of 550 p.s.i.g. and sprayed into a cocurrent stream of hot air. The inlet temperature of the air was 560° F. and the outlet temperature was 230° F. The Hunter color coordinates for this spray dried powder were determined using a Hunter Laboratory D–25 Color Difference Meter. The results were: $L=24.0$; $a=7.7$; and $b=10.0$. Three pounds of this powder was separated for use in preparing an agglomerated instant coffee product within the scope of this invention, as fully described in part C, below.

(B) Using 500 pounds of the same type of roast and ground coffee as in part A, a second aqueous coffee extract was prepared. The extraction system consisted of six stainless steel columns, each six feet high and six inches in diameter, connected in series for continuous countercurrent operation. Each column held approximately twenty-six pounds of the roast and ground coffee. Prior to extraction, each column of coffee was distilled with 10 p.s.i.g. steam for 23 minutes. The distillate was passed through a 35° F. condenser, followed by a −110° F. cold trap. An average of 1.3 pounds of distillate per column of roast and ground coffee steamed was obtained.

The steam distilled roast and ground coffee was extracted countercurrently with water which entered the extraction system at a temperature of 360° F. The extract temperature decreased via natural heat losses as it passed through the system and was withdrawn from the column containing the freshest roast and ground coffee at a temperature of 210° F. The final extract had a coffee solubles content of 23.1% by weight.

The extract and distillate obtained above were mixed at an extract:distillate weight ratio of 20:1. Five pounds of this flavor enriched extract were separated for freeze drying. The extract was poured in eight inch by twelve inch by one-half inch deep stainless steel freezer trays to a depth of one-quarter inch. The trays were then suspended in a Dry Ice-acetone bath having a temperature of −30° F. After twelve minutes the frozen slabs of extract were removed from the trays and hand granulated to about one-quarter inch in size. The frozen particles, at a loading factor of 0.8 pound per square foot, were placed in the trays of a REPP Industries, Inc., "Sublimator 40" laboratory scale freeze drier. The pressure was reduced to 150 microns of mercury absolute and radiant heat was applied to remove the frozen water from the particles by sublimation. The maximum coffee particle temperature during drying was 110° F. After nine hours, drying was completed and the freeze dried particles were withdrawn from the freeze drier. The particles were reduced in size by forcing them through a United States Standard No. 28 mesh screen. The Hunter color coordinates of these light brown coffee particles were obtained using the same Color Difference Meter as above. The coordinates were: $L=29.8$, $a=9.6$ and $b=13.4$.

(C) The spray dried powder from part A (2.7% moisture by weight) was mixed with the freeze dried powder from part B (2.2% moisture by weight) at a spray dried: freeze dried weight ratio of 60:40, and then blended by hand to obtain a uniform mixture. A one pound segment of this mixture was separated to prepare an agglomerated instant coffee powder. The segment was placed in an inverted conical tank having a compressed air source attached to its lower end. The instant coffee particles were fluidized by injecting 0.4 p.s.i.g. air into the cone. Onto the fluidized particles was sprayed a 60% by weight coffee solubles solution which had been prepared by dissolving in water a portion of spray dried solids from part A, above. The solution was atomized at 300 p.s.i.g., the spraying rate was ten grams of liquid per second, and the weight of the solution was equal to 6.5% by weight of the fluidized coffee particles. The fluidization was continued for thirty seconds to allow the particles to agglomerate. The final product (4.5% moisture by weight) was forced through a United States Standard No. 12 mesh screen to break up excessively large agglomerates and all fines were removed using a United States Standard No. 48 mesh screen. The material retained on the 48 mesh screen was observed and, since the light and dark colored portions of instant coffee differed on the Hunter color L scale by at least 5 units, the agglomerated instant coffee product was found to resemble conventional roast and ground coffee.

EXAMPLE II (A) Using the same equipment and method described in Example I, part B, an extract and a distillate is prepared from 500 pounds of the same type of roast and ground coffee described in Example I, part A. The concentration of coffee solubles in the extract is 24% by weight; an average of 1.8 pounds of distillate per column of roast and ground coffee steamed is obtained.

A 75% by weight segment of the extract is spray dried in the spray tower described in Example I, part B. The atomizing pressure is 530 p.s.i.g. and the air inet and outlet temperatures are 520° F. and 260° F. respectively. These spray dried solids and all of the distillate obtained above are returned to the remaining 25% by weight segment of the original extract to produce a concentrated extract with a 50% by weight concentration of coffee solubles (density=1.15 gm./cc.).

(B) An 85% by weight segment of the concentrated extract from part A, above, is spray dried in the same tower as described in Example I, part A, using an atomizing pressure of 530 p.s.i.g. and air inlet and outlet temperatures of 470° F. and 220° F. respectively. The Hunter color coordinates of this dark brown coffee powder are measured with a Hunterlab D-25 Color Difference Meter. The coordinates are: L=21.7, a=7.0, and b=9.3.

The remaining 15% by weight segment of the concentrated extract is aerated to produce a density in the aerated extract of 0.65 gm./cc. This aerated extract is spray dried in the same tower as above, using an atomizing pressure of 400 p.s.i.g. and air inlet and outlet temperatures of 460° F. and 220° F., respectively. The Hunter color coordinates of this light colored spray dried powder are: L=30.4, a=10.5 and b=15.6.

(C) The two spray dried powders from part B of this example are mixed by hand in the following proportions to prepare one pound samples of each mixture of instant coffee: (1) 80% by weight dark colored powder and 20% by weight light colored powder: (2) 85% by weight dark colored powder and 15% by weight light colored powder; and (3) 90% by weight dark colored powder and 10% by weight light colored powder. Each sample is agglomerated using the method, equipment, and type and amount of agglomerating fluid described in Example I, part C. Each agglomerated sample is forced through a United States Standard No. 12 mesh screen to break up excessively large agglomerates, and the fines are removed using United States Standard No. 48 mesh screen. The agglomerated material retained on the 48 mesh screen is observed and is found to resemble conventional roast and ground coffee.

EXAMPLE III

A series of instant coffee samples are prepared using the spray dried powder of Example II, part B (L=21.7, a=7.0 and b=9.3), the spray dried powders of Example I, part A (L=24.0, a=7.7 and b=10.0) and the spray dried powder of Example II, part B (L=30.4, a=10.5 and b=15.6). Each sample weighs one pound and the composition of the samples is given in the following table.

| Sample | Weight percent instant coffee having Hunter color coordinates of— | | |
|---|---|---|---|
|  | L=21.7, a=7.0, b=9.3 | L=24.0, a=7.7, b=10.0 | L=30.4, a=10.5, b=15.6 |
| 1 | 80 | 10 | 10 |
| 2 | 60 | 30 | 10 |
| 3 | 40 | 10 | 50 |
| 4 | 25 | 55 | 20 |

Each sample is mixed by hand and agglomerated using the same method, equipment and type and amount of agglomerating fluid described in Example I, part C. Each agglomerated sample is forced through a United States Standard No. 12 mesh screen to break up excessively large agglomerates, and the fines are removed using United States Standard No. 48 mesh screen. The agglomerated material retained on the 48 mesh screen is observed and is found to resemble conventional roast and ground coffee.

What is claimed is:
1. A method of preparing an agglomerated instant coffee product having the appearance of roast and ground coffee, said method comprising:

(a) Preparing an aqueous coffee extract having a solubles concentration of from about 35% to about 50% by weight, said extract having a density of from about 0.5 gram/cc. to about 0.9 gram/cc.; and thereafter, (b) Spray drying said extract at moderate spray pressures of from about 300 p.s.i.g. to about 400 p.s.i.g. at an air inlet temperature of from about 450° F. to about 500° F. and an air outlet temperature of from about 230° F. to about 270° F.; whereby a light colored portion of instant coffee is produced having a color which is defined by Hunter color values of: L scale, from about 25 to about 40; a scale, from about 5 to about 15; b scale, from about 5 to about 20; and (c) Preparing an aqueous high concentration extract having a solubles concentration of from about 45% to about 60% by weight, said extract having a density of from about 1.1 grams/cc. to about 1.2 grams/cc.; and (d) Spray driving said extract at moderately high spray pressures of from about 450 p.s.i.g. to about 600 p.s.i.g. at an air inlet temperature of from about 450° F. to about 500° F. and an air outlet temperature of from about 230° F. to about 270° F.; whereby a dark colored portion of instant coffee is produced having a color which is defined by Hunter color values of: L scale, from about 18 to about 35; a scale, from about 5 to about 15; b scale, from about 5 to about 15; said dark colored portion of instant coffee differing from said light colored portion of instant coffee on the Hunter color L scale by at least 5 units; and thereafter, (e) Mixing said light colored portion of instant coffee and said dark colored portion of instant coffee to form a mixture of the light and dark colored portions, said light colored portion comprising from about 10% to about 50% by weight of the mixture and said dark colored portion comprising from about 50% to about 90% by weight of the mixture; and thereafter, (f) Agglomerating the mixture of portions of instant coffee by uniformly contacting the particles of said portions with a fine spray of concentrated aqueous coffee extract containing from about 40% to about 70% by weight of coffee solubles to produce particles at least about 80% by weight which have a size of from about 12 mesh to about 48 mesh, U.S. Standard screen sizes.

2. The method of claim 1 wherein the agglomerating of step (f) is accomplished by agitating said light colored and dark colored portions in a fluidized bed, and while said particles are being agitated, uniformly contacting said particles with a fine spray of said concentrated aqueous coffee extract to provide an agglomerated product having a moisture content of from about 2% to about 4.5% and a particle size of from about 12 mesh to about 48 mesh U.S. Standard screen sizes.

References Cited

UNITED STATES PATENTS

| 2,751,687 | 6/1956 | Colton | 34—5 |
| 2,788,276 | 4/1957 | Reich | 99—71 |
| 2,977,203 | 3/1961 | Sienkiewicz et al. | 23—313 |
| 3,244,533 | 4/1966 | Clinton et al. | 99—71 |
| 3,293,766 | 12/1966 | Togashi et al. | 34—5 |

OTHER REFERENCES

Sivetz et al.: Coffee Processing Technology, Avi Publ. Co., vol. 1, Westport, Conn. (1963), pp. 474–508.

Sivetz: Coffee Processing Technology, vol. 2, Avi Publ. Co., Westport, Conn. (1963), pp. 132–137.

MAURICE W. GREENSTEIN, Primary Examiner